Figure 1:
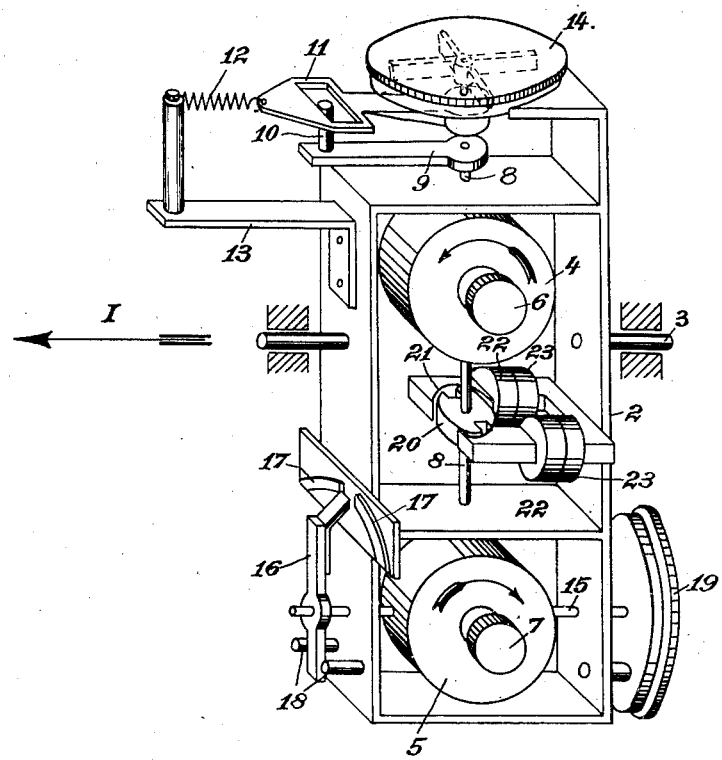

Dec. 19, 1933.　　　J. M. BOYKOW　　　1,940,387
GYROSCOPIC PENDULUM
Filed July 13, 1931

Inventor:
Johann Maria Boykow
by
Lotka & Kehlenbeck
Attorneys.

Patented Dec. 19, 1933

1,940,387

UNITED STATES PATENT OFFICE 1,940,387

GYROSCOPIC PENDULUM

Johann Maria Boykow, Berlin-Lichterfelde-West, Germany, assignor to Gesellschaft für Elektrische Apparate m. b. H., Marienfelde, near Berlin, Germany, a corporation of Germany Application July 13, 1931, Serial No. 550,511, and in Germany July 16, 1930

6 Claims. (Cl. 33—204)

The invention relates to a gyroscopic pendulum for air and water craft, which swings upon an axis extending in the direction of travel of the vessel or vehicle, and which, in addition to indicating the tilting of the vehicle about said axis, is also adapted to indicate the speed at which the vehicle changes its direction of travel.

According to the invention a first or main gyroscope having two degrees of precession freedom, is so mounted in the pendulum that its axis of rotation extends transversely to the direction of travel and its axis of precession stands vertically. A damping arrangement is connected with this precession axis on the one hand, in such manner that the accelerations of the gyroscope corresponding to the precession speed are damped and accordingly constitute a gauge for the speed at which the vehicle changes its direction of travel. In addition a torque generator is coupled to the precession axis of this gyroscope, the control action of which becomes effective against turning movements of the vehicle about its upright axis, that is against changes in its course, through the medium of a second gyroscope having two degrees of precession. For this purpose, the latter gyroscope includes a horizontally arranged precession axis, and a rotation axis extending perpendicularly thereto. As the precession axis of this second gyroscope lies in the plane in which the turning movements of the vehicle when changing its course, take place, this second gyroscope, during changes in the course of travel, effects an adjustment of the control means whereby the precession axis of the first gyroscope is rotated by the torque generator in a manner to cause said first gyroscope to develop a correcting torque on the pendulum in such a direction that the pendulum is forced into the perpendicular position. Because this second gyroscope does not serve to stabilize the pendulum but is merely intended to control the torque generator which is connected with the first gyroscope when the vehicle changes its course, said second gyroscope may be located in the vehicle at a suitable point outside of the pendulum. The horizontally lying precession axis will in such case be swung along during changes in the course of the vehicle, so that it develops a precession force in one or the other direction dependent upon the direction of the course change and thereby correspondingly switches in the torque generator. With this purpose in view, the second gyroscope may, however, be also mounted in the pendulum and preferably so that its rotation axis lies transversely to the direction of travel, and its precession axis horizontal and in the direction of travel. This has the advantage that the precession pressures of this gyroscope, when the vehicle changes its course, in dependence upon the turning direction, are either added to or subtracted from the centrifugal torque of the turning movements upon the pendulum, whereby corresponding effects are obtained.

The damping of the precession deflections of the main gyroscope preferably are accomplished by means of a stop fork which adjusts a conventional means for damping the precession movements of gyroscopes, such as for instance a hydraulic winged wheel device. This stop fork is controlled by a stop arm arranged on the precession axis of the gyroscope, and engaging said fork with a predetermined amount of play, so that the gyroscope may fully precess within the limits of such play, while excessive precession deflections are damped in accordance with speed of precession. During slight deflections the arm (within the fork guide) thereby forms the direction indicator for the travel over ground, and during greater deflections indicates the turning speed of the vehicle.

To enable the appliance to be employed as indicator for the direction of travel over ground a device is provided which permits of an adjustable torque being exerted on the precession axis of the main gyroscope for compensating or neutralizing the influence of the rotation of the earth. The torque is preferably generated by means of a moving coil located in a magnetic field. In the same magnetic field may be placed coils which are controlled by the correction gyroscope so that a correcting torque may be exerted upon the gyroscope by the same device.

In the drawing forming part of this application

Fig. 1 shows one embodiment of my invention in diagrammatic representation, and

Figure 2:
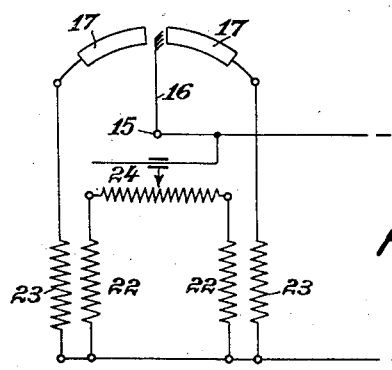

Fig. 2 a diagram of connections for the device for exerting the correcting torque on the main gyroscope.

Assuming that the appliance according to my invention should serve as auxiliary apparatus for steering an airplane the arrow I in Fig. 1 indicates the direction of flight. A frame 2 is suspended in the airplane and adapted to rotate around a horizontal axis located in the direction of flight. In this frame are journaled a main gyroscope 4 and a correcting gyroscope 5. Each of the gyroscopes has a horizontal axis of rotation 6 and 7 located transversely to the direction of flight.

The main gyroscope 4 also possesses a vertical precession axis 8, so that altogether it has two degrees of precession freedom, viz, around this axis and the pendulum axis 3.

On the precession axis 8 is mounted an arm 9 with a stop pin 10 which projects into the recess of a fork 11. The extreme end of the fork 11 is engaged by a retrieving or return spring 12 tending to maintain the fork in the midposition and at the other end attached to a bracket 13 at the frame 2. The fork 11 is furthermore connected with a damping device 14 shown in elevation only and in the embodiment illustrated envisaged as a liquid-controlled brake. The damping device 14 consists of a winged wheel arranged on the pivotal axis of the fork 11 and rotating in the air or liquid with which the casing of the damping device 14 is filled.

The correction gyroscope 5 possesses only a horizontal precession axis 15 located in the frame 2 in the direction of flight. Upon the axis 15 is mounted a contact arm 16 which cooperates with the stationary contacts 17. Stops 18 limit the deflection of the contact arm 16 and thus the precession deflection of the correction gyroscope 5. Another winged wheel is combined with the axis 15 of the gyroscope 5 and rotates in the air or liquid filled casing of the damping device 19, so that the deflections of the precession axis 15 correspond to the speed at which the vehicle changes its direction of travel.

On the precession axis 8 of the main gyroscope 4 is mounted an armature 20 in a magnetic field 21 with two pairs of coils 22 and 23. The pair of coils 22 serves for compensating or neutralizing the influence of the rotation of the earth, and the pair of coils 23, preferably of the Deprez type, is controlled by the correction of gyroscope 5, see the diagram of connections Fig. 2 in which like reference signs are used as in Fig. 1. There is also diagrammatically shown a sliding contact 24 which enables the current intensities in the coils 22 to be varied.

The appliance described functions in the following manner: when the airplane follows a straight-line course the pendulum formed by the frame 2, the gyroscopes 4 ind 5 and the further parts described hang down perpendicularly by gravity. If the airplane unintentionally deviates from the direction of travel over ground, either due to a turning movement or a side displacement, an accelerating torque is developed on the pendulum. This torque causes a precession of the gyroscope 4 around the axis 8. If the deflection from the travel over ground is connected with a turning movement the gyroscope 5 also precesses and, in view of the fact that in the embodiment illustrated both gyroscopes rotate in opposite directions, exercises a torque on the pendulum 2 as soon as the arm 16 abuts against the stops 18, which torque is added to the acceleration pressure on the pendulum.

In these precessions the movement of the arm 9 shows the pilot the deflection from the travel over the ground as regards its direction and within the freedom of motion determined by the fork 11 also as regards the magnitude, since the influence of the rotation of the earth is compensated.

If during a straight-line flight the pendulum hangs down obliquely for any reason, a torque is exerted on the pendulum by its deflection from the vertical. This torque causes a precession of the gyroscope 4. If the pilot steers according to the indication of the arm 9 or if the airplane is operated by automatic control gear, this precession of the gyroscope 4 has the result that the airplane passes into a corresponding very flat curve. By this turning of the airplane the gyroscope 5 attains precession and switches in a correction torque which automatically forces the pendulum into the vertical position. The correction torque is in the order of magnitude chosen so small that it only slightly exceeds the bearing friction of the precession axis 8.

If the airplane is intentionally turned into a curve, the centrifugal accelerating torque upon the pendulum together with the precession torque of the gyroscope 5 very quickly causes the arm 9 with its pin 10 to come in contact with the fork 11. In this way the precession freedom around the axis 8 of the main gyroscope is limited and the pendulum now gives way to the combined pressure of the centrifugal acceleration and the precession pressure of the gyroscope 5 and sets itself on the resultant of gravity and centrifugal force. Simultaneously the arm 9 has travelled so far that the pilot is able to read clearly from its position the nature of the curve.

Since the arm 9 and thus the main gyroscope 4 have a certain freedom of motion within the fork 11, the pendulum remains in the true perpendicular when the plane travels a straight-line course until the arm 9 comes in contact with the fork 11. The pilot is thus able to adjust his airplane according to the pendulum for the true perpendicularity when travelling a straight-line course, without rendering it impossible for him to recognize deflections from the course. When negotiating curves, on the other hand, the pendulum sets itself on the apparent perpendicular corresponding with the curve, due to the braking of the precession of the gyroscope 4 by the fork 11. The pilot is thus able to bring his airplane in the curve also into the correct position corresponding with the state of the flight, the deflection of the arm 9 bringing the flight in the curve again to his notice. In flights through curves the correction torques of the gyroscope 5 play no part, because they can be neglected against the torques resulting from the acceleration pressures.

I claim as my invention:

1. A gyroscopic pendulum for air and water craft, including a supporting means having an axis arranged in the direction of travel, a gyroscope supported on said means on a horizontal axis of rotation and a vertical precession axis, damping means connected with the precession axis of said gyroscope, a torque generator also connected with said precession axis, control means for said torque generator, and a second gyroscope having a horizontal precession axis and an axis of rotation perpendicular thereto, said horizontal precession axis being connected with said control means for controlling the same.

2. A gyroscopic pendulum for air and water craft, including a supporting means having an axis arranged in the direction of travel, a gyroscope supported on said means on a horizontal axis of rotation and a vertical precession axis, a hydraulic damping means connected and rotatable with the precession axis of said gyroscope, a torque generator also connected with said precession axis, control means for said torque generator, a second gyroscope having a horizontal precession axis and an axis of rotation perpendicular thereto, said horizontal precession axis being connected with said control means for controlling the same, and damping means connected with the precession axis of said second gyroscope.

3. A gyroscopic pendulum for air and water craft comprising a pendulum frame, an axis for said frame extending in the direction of travel, a first gyroscope supported in said frame on a horizontal axis of rotation extending transversely to said direction of travel and a vertical precession axis, a torque generator connected with the precession axis of said first gyroscope, control means for said torque generator, a second gyroscope mounted in said frame and having a horizontal precession axis and an axis of rotation extending transversely to said direction of travel, the precession axis of said second gyroscope being connected with said control means for controlling the same, and damping means connected with the precession axis of said first gyroscope.

4. A gyroscopic pendulum for air and water craft comprising a pendulum frame, said frame being pivoted on an axis extending in the direction of travel, a first gyroscope supported in said frame on a horizontal axis of rotation extending transversely to said direction of travel and a vertical precession axis, a torque generator connected with the precession axis of said first gyroscope, control means for said torque generator, a second gyroscope mounted in said frame and having a horizontal precession axis and an axis of rotation extending transversely to said direction of travel, the precession axis of said second gyroscope being connected with said control means for adjusting the same, and two fluid containing damping means of which one is connected and rotatable with the precession axis of the first gyroscope and the other with the precession axis of the second gyroscope.

5. A gyroscopic pendulum for air and water craft comprising a pendulum frame, an axis for said frame extending in the direction of travel, a first gyroscope supported in said frame on a horizontal axis of rotation extending transversely to said direction of travel and a vertical precession axis, a torque generator connected with the precession axis of said first gyroscope, control means for said torque generator, a second gyroscope mounted in said frame and having a horizontal precession axis and an axis of rotation extending transversely to said direction of travel, the precession axis of said second gyroscope being connected with said control means for adjusting the same, and damping means comprising an arm arranged on the precession axis of said first gyroscope, a casing filled with a fluid, a winged wheel rotatable in said fluid filled casing, and a fork arranged on the axis of said wheel and in which said arm engages with a predetermined amount of play.

6. A gyroscopic pendulum for air and water craft comprising a pendulum frame, a first gyroscope supported in said frame on a horizontal axis of rotation extending tranversely to the direction of travel and a vertical precession axis, an electro-magnetic torque generator connected with the precession axis of the first gyroscope, electrical control means for said torque generator including a contact arm, a second gyroscope mounted in said frame and having a horizontal precession axis and an axis of rotation extending transversely to said direction of travel, the contact arm of said control means being fixed on the precession axis of said second gyroscope, and damping means connected with the precession axis of the first gyroscope.

JOHANN MARIA BOYKOW.